Patented Jan. 16, 1923.

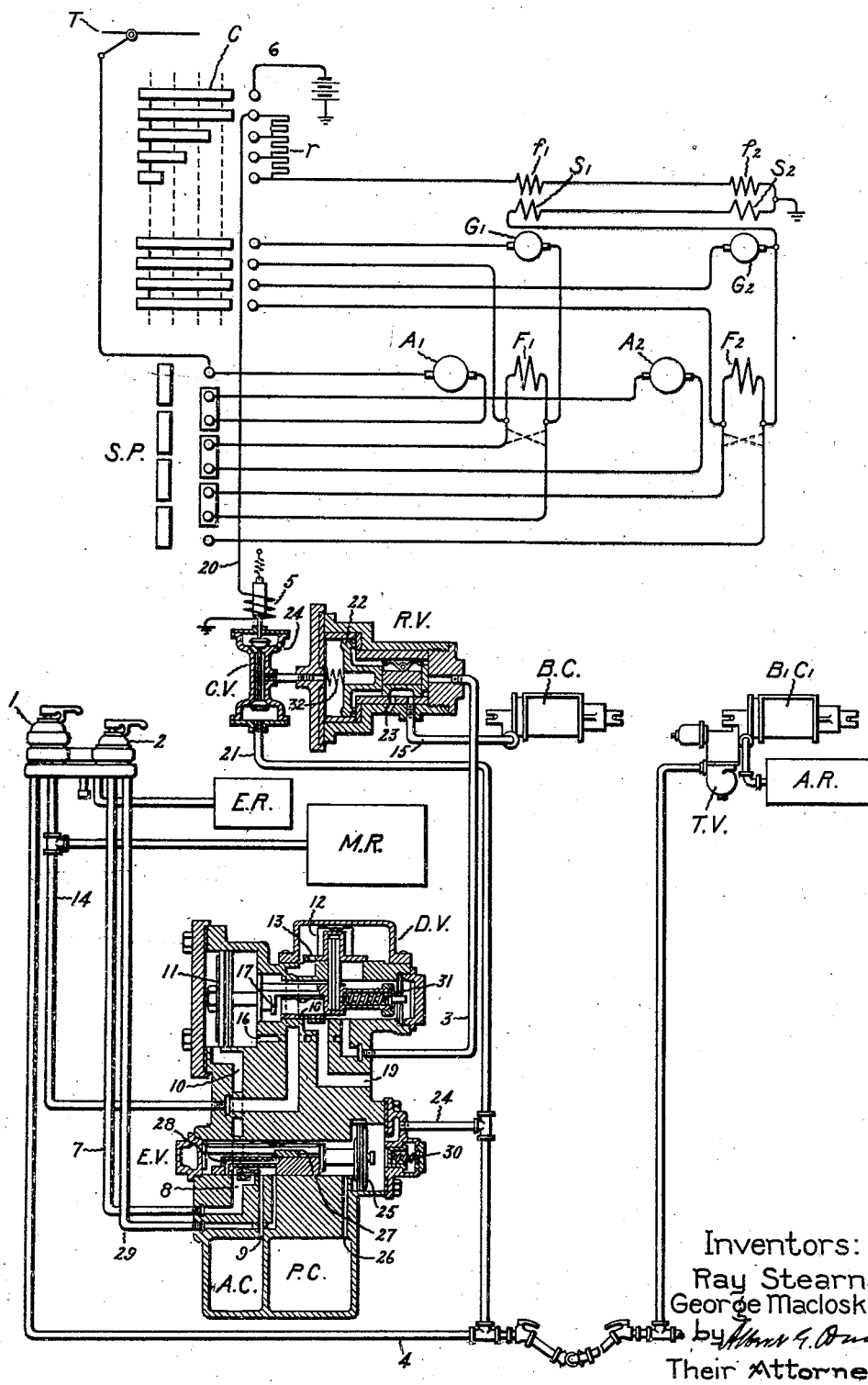

1,442,305

UNITED STATES PATENT OFFICE.

RAY STEARNS, OF SCHENECTADY, NEW YORK, AND GEORGE MACLOSKIE, OF ERIE, PENNSYLVANIA, ASSIGNORS TO GENERAL ELECTRIC COMPANY, A CORPORATION OF NEW YORK.

BRAKING SYSTEM.

Application filed February 26, 1917. Serial No. 150,939.

*To all whom it may concern:*

Be it known that we, RAY STEARNS and GEORGE MACLOSKIE, citizens of the United States, residing respectively at Schenectady, county of Schenectady, State of New York, and Erie, county of Erie, State of Pennsylvania, have invented certain new and useful Improvements in Braking Systems, of which the following is a specification.

Our invention relates to the braking of a train unit such as an electric locomotive or the like, and it provides improved means whereby the braking effect may be had in a safe, reliable and efficient manner.

For considerations of safety, convenience, and economy, it is desirable to have both an electric braking system and air braking system of any of the well known types installed on a railway train unit, such as an electric locomotive, and it is further desirable that each of these systems be separately operable; that is, each system should be available for use so that either one or the other of the systems as desired could be used to retard the speed of the train unit. On the other hand, however, it is not desirable generally to permit the application of both brakes simultaneously, since this may result in sliding the wheels, or cause an indefinite control of the braking power, or some other undesirable feature, and at best imposes too much upon the attention of the operator.

Our invention, therefore, involves the use of both an electric braking system (such as a regenerative braking system or a dynamic braking system) and the usual air brakes on the same electric locomotive or car, and has for its object the improvement of the braking effect which may be had where such braking systems are provided. More particularly, the object of our invention is an arrangement by which the progress of the electric locomotive or other train unit provided with these braking systems may be impeded by either braking system separately, but may not be impeded generally by the simultaneous application of both systems on any single train unit except in cases of emergency. Where the train unit, such as an electric locomotive, is provided with these separately operable braking systems and the cars drawn by the locomotive are provided with merely the usual air brakes, it is our object to provide an arrangement whereby the air brakes may either be applied to the locomotive or the entire train, or the electric braking may be applied to the locomotive and the air brakes to the cars.

In general, it may be said that in carrying our invention into effect, we provide an arrangement having, among others, the following important features: (1) If the electric braking is applied on the locomotive or other unit provided with an electric braking system and later any change is made in the pressure of a brake pipe of the air brake system to induce an independent or automatic service application of the air brakes, no air is admitted to the brake cylinders of the unit or units having an electric braking; (2) if the service application of the air brakes has been made, a subsequent application of the electric braking releases the air from the brake cylinders on the locomotive or other train unit provided with an electric braking system; (3) in emergency, the air brakes can be applied and maintained irrespective of prior or subsequent electric braking application.

More specifically we preferably provide a release valve in the air brake system, this valve being controlled by the electric braking system and operated responsively to the pressure in the brake pipe to connect the locomotive brake cylinder to atmosphere and prevent the application of the air brakes on the locomotive when the electric brake is applied, or to release the air brakes on the locomotive upon the application of the electric brake after an independent or service application has been made, and to further control this valve so that both the air and electric braking may be applied in an emergency. More specifically we cause this release valve to be actuated responsively to the difference between the pressure of the brake pipe and the pressure of the brake cylinder side of the distributing valve and govern the operation of this valve by means of an electromagnetically actuated control valve which is controlled by the electric braking controller.

For a better understanding of our invention, reference is had to the following description of the accompanying drawing. The single figure of the drawing shows our invention applied to the braking of an electric locomotive and the cars drawn thereby. Referring to the drawing, the driving motors, having armatures $A_1$ and $A_2$, are provided with series fields $F_1$ and $F_2$ which are super-excited by the small exciter generators $G_1$ and $G_2$, respectively, during regenerative braking. These small generators are driven at a substantially constant speed by an electric motor which has been omitted for the sake of clearness. The excitation of these small generators $G_1$ and $G_2$ is furnished by shunt fields $f_1$ and $f_2$ and by series fields $S_1$ and $S_2$, the former being energized from low voltage supply 6 and the latter being connected in series with the driving motors during the regenerative braking. The excitation of the shunt fields $f_1$ and $f_2$ is controlled by varying the resistance $r$ by means of the controller C. The driving motors furnish electrical energy to the trolley T during regenerative braking, the circuit being from the ground, through the series fields $S_2$ and $S_1$ of the small generators, series field $F_2$, contact of the series parallel controller S. P., through the series field $F_1$, contact of the series parallel controller, motor armature $A_2$, contact of series parallel controller, and motor armature $A_1$ to the trolley.

The air brake system shown in the drawings is provided for the locomotive and also for the cars drawn thereby, the equipment at the left of the drawing being located on the locomotive and the equipment at the right being located on one of the cars or other train units drawn by the locomotive.

The air brake equipment on each other train unit may be regarded as like that illustrated at the right of the drawing. Air is supplied to the main reservoir M R by means of an air compressor, or other suitable means, and the equalizing reservoir E R receives air from the main reservoir and operates in a well understood manner. The automatic engineer's valve 1 is provided for controlling the emergency and service applications of the air brakes on both the locomotive and train units, and the engineer's independent brake valve 2 is provided for controlling the application or release of the air brakes on the locomotive itself independently of the operation of the air brakes on the other train units. The distributing valve D. V. is controlled by the engineer's valves 1 and 2 in a manner to be hereinafter more fully described. Connected between the brake cylinder pipe 3 leading from the distributing valve and the brake cylinder B. C. on the locomotive is a release valve R. V. which is controlled by means of an electromagnetically actuated control valve C. V., and is actuated responsively to the difference between the pressure of the brake pipe 4 and the pressure in the pipe 3 which is on the brake cylinder side of the distributing valve D. V., to admit air to the brake cylinders on the locomotive or to exhaust the air from those cylinders to atmosphere and release the brakes, at the same time closing the passage from the distributing valve to the brake cylinders and to the atmosphere, depending upon the operation of the electric braking system. The control valve C. V., and the release valve R. V. connect the two braking systems, and the arrangement is such that if the independent brake valve 2 has been operated to cause an independent application of the air brakes on the locomotive, or the engineer's automatic valve 1 has been operated to make a service application of the air brakes on the locomotive and the other train units, upon moving the controller C of the electric braking system to the right to cause the driving motors to operate as generators and supply energy to the trolley, the electromagnet 5 of the control valve will be energized through the controller, thereby admitting brake pipe pressure to the cylinder of the release valve R. V., forcing the piston of the release valve to the position shown in the drawings. This will connect the braking cylinder B. C. of the locomotive air brakes to atmosphere and release the brakes on the locomotive, at the same time closing the passage from the distributing valve to the brake cylinder and to the atmosphere. Each of the two braking systems is separately operable, that is, electric braking may be applied without at the same time applying the air brakes, or vice versa, thereby giving a very nice control of the retardation of the train.

The electric braking system will now be described. It will be assumed that the locomotive is operating on a down grade and the driving motors are being driven thereby so that superimposing an excitation on the series fields of these motors causes them to generate an electromotive force greater than the voltage impressed on the motors by the connection with the trolley, and the motors will then cease operating as motors and become generators, returning energy to the trolley in a well understood manner. The control apparatus for starting the motors has not been shown since any of the well known starting and controlling arrangements may be provided, the braking control alone being shown, and this in a very diagrammatic manner for the sake of clearness. Moving the controller C to the right to the first operative position connects the shunt fields $f_1$ and $f_2$ to the supply conductor 6, which is usually at a reduced voltage from that of the trolley for considerations of safety. In this first position, the armatures of the generators $G_1$ and $G_2$ are likewise connected in multiple to the fields $F_1$ and $F_2$, respectively, of the driving motors and this connection is maintained throughout all of the operative positions of the braking controller. As the controller is advanced to the right, the shunt field resistance $r$ is cut out, thereby increasing the excitation of the generators $G_1$ and $G_2$, causing them to generate a higher voltage and thus increase the excitation of the driving motors operating now as generators and causing them to generate a higher voltage and return more energy to the line. The series fields $S_1$ and $S_2$ of the exciters for the fields of the main motors $F_1$ and $F_2$ are provided for taking care automatically of the fluctuating voltage of the trolley and to give a practically constant regenerative braking effect for each of the positions of the braking controller.

Let it be assumed that it is desired to make an independent slow application of the air brakes on the locomotive and that no electric braking and no application of the air brakes on the cars are desired. Assuming that the automatic valve 1 is in running position, the engineer will turn the independent brake valve 2 to the slow application position, thereby opening the connection from the main reservoir M R, through the independent brake valve 2, the application cylinder pipe 7, the passage 8 of the equalizing valve, passage 9 to the application chamber A. C., thereby building up the pressure in this application chamber. The air likewise flows from the passage 8 to and through the passage 10 to the left-hand side of the application piston 11, forcing this piston to the right from the position shown in the drawing and thereby moving the slide valve 12 of the distributing valve to the right, causing the restricted port 13 to be uncovered. This permits air to flow from the main reservoir M. R. through the main reservoir pipe 14 to the chamber on top of application slide valve 12 of the distributing valve, through port 13, pipe 3, to the release valve R. V., thereby forcing the piston of the release valve to the left and uncovering the port leading to the pipe 15 which is connected to the brake cylinder B. C. The brakes on the locomotive are thus applied independently of the brakes on the other train units. It is well understood that the air flowing from the main reservoir to the application cylinder pipe 7 passes through a restricted opening in the independent brake valve 2 so that it takes some time for the pressure to build up in the application cylinder of the distributing valve, and thereby cause a slow application of the brakes.

After the brakes have been applied, the engineer will bring the engineer's valve back to the lap position, thereby holding the brakes set. When pressure in the brake cylinder B. C. has built up to such a value that it exceeds the pressure in the application cylinder pipe 7 and the pressure in the application chamber A. C., the application piston 11 will be moved to the left, thereby closing the port 13 and cutting off the supply of air to the brake cylinder from the main reservoir. The passage 16 connecting the right-hand side of the application piston and the pipe 3 permits the pressure on the brake cylinder side of the distributing valve to be communicated to the cylinder in which application piston 11 operates. In case air should leak from the brake cylinder or from any of the passages leading from the distributing valve to the brake cylinder, the pressure in the application chamber A C and on the left hand side of the application piston 11, will again move the application piston to the right and uncover the port 13 in the slide valve of the distributing valve to admit more air from the main reservoir through the pipe 14 to the pipe 3 and the brake cylinder B. C. The brakes will, therefore, be maintained despite leakage.

It will be noticed that the piston rod of the application piston 11 has a lug 17 which engages the slide valve 18 after the application piston has moved a short distance to the right. This causes the slide valve 18 to lap the exhaust passage 19 and prevent escape of air from the distributing valve chamber to atmosphere. When the application piston is caused to move the short distance to the left due to the increase of pressure on the brake cylinder B. C., the slide valve 18 will not be moved to uncover the exhaust passage 19 because of the play between the piston rod of the application piston and this slide valve. This exhaust passage will, however, be uncovered when the pressure in the application chamber is materially reduced, as, for instance, when the engineer's valve is turned to the release position, thus permitting the distributing valve chamber and the brake cylinder B. C. to be exhausted to atmosphere.

Let it be assumed that there has been a slow or service application of the air brakes on the locomotive, that the train is on a grade, and that it is desired to apply the electric brake. This will be done by moving the controller C to the first position to the right, thereby causing the driving motors to operate as generators and supply energy to the line. At the same time the electromagnet 5 is energized through the conductor 20, thereby lowering the control valve piston and connecting the chamber of the release valve to the pipe 21, which is connected to the brake pipe. Air then flows from the brake pipe and moves the piston 22 of the release valve to the right, since the pressure of the brake pipe is greater than that of the brake cylinder side of the distributing valve and hence on the opposite side of the piston 22. The piston of the release valve will thus be moved to the position shown in the drawing, connecting the brake cylinder B. C. on the locomotive through the pipe 15 to the exhaust passage 23. The brake cylinder is thus connected to atmosphere and the air brakes on the locomotive are released. From this it can be seen that the two braking systems are connected together and that the air brakes on the locomotive are controlled by the electric braking system so that applying the electric brake automatically releases the air brakes on the locomotive when the independent slow or service application of the brakes has been made. It is to be noticed that this arrangement has the further desirable feature that in case the electric braking effect is discontinued, the electromagnet 5 will be deenergized and the control valve will move upward in accordance with its bias, closing the connection between the piston chamber of the release valve and the pipe 21 connected to the brake pipe, and at the same time connecting the piston chamber of the release valve to the atmosphere through the exhaust passage 24 of the control valve. The piston of the release valve will thereby be moved to the left (if there is pressure on the brake cylinder side of the distributing valve), closing the exhaust passage 23 and connecting the brake cylinder to the pipe 3, thereby automatically remaking an application of the air brakes on the locomotive and insuring that the locomotive will not be without a braking effort if the operator from the positions of his valves 1 and 2 may expect braking effort by the air brakes. It will be noticed that while the electric brake is in operation an application of the air brakes on the locomotive can not be made by the operation of the independent engineer's valve, although an emergency application can be made, as will be hereafter more fully described.

In order to make a quicker independent application of the air brakes on the locomotive, the engineer's valve 2 will be turned to the quick application position, thereby permitting the pressure in the application cylinder pipe 7 to be quickly raised to a relatively high pressure. This will cause the application piston 11 to be more quickly moved to the right, uncovering the port 13 in the distributing valve quickly, and because of the fact that the pressure on the left-hand side of the application piston is greater, a greater pressure of air will be obtained in the brake cylinder before the application piston is caused to automatically move to the left and close the port 13. Operating the electric brake now releases the air brakes in the same manner as that described in connection with the slow application of the air brakes on the locomotive.

It is understood that the pressure chamber P. C. has been supplied with air from the brake pipe 4, through the pipe 24, around the equalizing piston 25 (through the feed groove) and through the passage 26. The pressure chamber will therefore ordinarily be at the pressure of the brake pipe. Assuming that the independent brake valve 2 is in running position, in order to make automatic service application of the air brakes on the locomotive and the train units, the automatic engineer's valve 1 is turned to the service application position, thus ultimately effecting a reduction of the brake pipe pressure. Because of the fact that the pressure chamber is then at a higher pressure than the brake pipe, the equalizing piston 25 will be moved to the right, closing the connection between the brake pipe and the pressure chamber, at the same time causing the slide valve 27 to uncover the port 28 in the equalizing valve, so that when the equalizing piston has moved to the right a sufficient distance, the passage 28 will be in alignment with the passage 8, and air will flow from the pressure chamber through the equalizing valve, through the passage 10, to the application cylinder and thus move the application piston to the right, applying the air brakes on the locomotive as heretofore explained, also supplying air through the passage 9 to the application chamber A. C. Filling the application chamber ensures that the brakes will be maintained despite leakage. When the pressure in P. C. has been reduced to slightly less than that of the brake pipe, the equalizing piston will be moved a slight distance to the left and the slide valve 27 will lap the port 28, cutting off the flow of air from P. C. to the application cylinder so that when the pressure has built up in B. C. to a value slightly greater than that in the application chamber, the application piston will be moved to the left and cut off the flow of air from the main reservoir to the brake cylinder B. C. by lapping the port 13. The brake cylinder $B_1 C_1$ on the train unit will be simultaneously supplied with air from the auxiliary reservoir A. R. through the triple valve T. V. to make a service application of the air brakes on this train unit. It is understood, of course, that the air brakes on the other train units are likewise applied in the same manner.

After the service application of air brakes on the locomotive and the train units has thus been made, turning the controller C to the brake position energizes the electromagnetically actuated control valve C. V. to release the air brakes on the locomotive in the same manner as heretofore described. The air brakes on the cars or other train units are, however, unaffected so that the service application on the locomotive is released upon the application of the electric brake, and this electric brake is assisted by the air brakes on the cars. In case it is desired to release the air brakes on the cars, this may be done without affecting the operation of the electric brake in the least by simply moving the automatic engineer's valve 1 to the release position and then to running position in accordance with approved practice. This causes the pressure in the brake pipe 4 to be built up to normal value, the equalizing piston 25 to be moved to the left, and the equalizing valve to be moved thereby into the position shown in the drawing, wherein the passage 10 is connected to atmosphere through the distributing valve release pipe 29. The application piston 11 will thereby be moved to the left and the slide valve 18 will uncover the exhaust port 19, thus connecting the brake cylinder to atmosphere and releasing the brakes. The brakes in the cars are released through the operation of the triple valves in a well understood manner.

In order to make an emergency application of the air brakes on the locomotive and the train, the valve 1 is moved to the emergency position, thereby reducing the pressure in the brake pipe very materially and rapidly, causing the equalizing piston 25 to be drawn over sharply against the spring 30, compressing this spring, moving the equalizing slide valve to uncover the connection between the pressure chamber P. C. and the passages 8 and 10, blanking the application chamber A. C., and permitting air to flow directly from the pressure chamber to the passage 10 without having to flow through the restricted port 28 in the equalizing slide valve. This admits pressure quickly on the left-hand side of the application piston 11 and causes this piston to move quickly to the right, compressing the spring 31 and admitting air directly from the main reservoir to the brake cylinder B. C. through the pipe 14 to the pipe 3 without having to pass through the restricted port 13. Because of the fact that the pressure in the brake pipe 4 has been very materially reduced, the pressure in the brake cylinders B. C. and B₁ C₁ will be very quickly built up to a high value for an emergency application in a well understood manner.

When an emergency application of the air brakes has been made, operating the controller C to apply the electric brake will not effect the release of the air brakes on the locomotive because the pressure in the brake pipe 4 has been reduced so low that it is not sufficient to move the piston 22 to the right and thus connect the brake cylinder B. C. to atmosphere. In an emergency, therefore, the electric braking system has no control over the air braking system, although it has such control when there has been an independent or automatic service application of the air brakes.

In case the difference betwen the pressure on the brake cylinder side of the distributing valve and the pressure in the train pipe is in any case found to be sufficient to move the release piston 22 to the right so as to release the brake after a service application when the electric brake is applied, a light spring 32 may be added which will slightly bias the piston 22 in that direction. This spring will be of such a strength that while normally biasing the piston 22 to the position shown in the drawing, thereby assuring the movement of the piston to this position when there is a small difference between the pressure in the train pipe and the pressure on the brake cylinder side of the distributing valve, it will not in any way interfere with the service or the emergency application of the brakes.

In accordance with the provisions of the patent statutes, we have described the principle of operation of our invention, together with the apparatus which we now consider to represent the best embodiment thereof; but we desire to have it understood that the apparatus shown is only illustrative, and that the invention can be carried out by other means.

It is to be understood that the applications of the brakes by the operation of the independent engineer's valve 2 are to be considered as "service" applications within the meaning of that term wherever used in the appended claims.

What we claim as new and desire to secure by Letters Patent of the United States, is:—

1. The combination with separately operable air and electric braking systems for an electric locomotive or the like, of a controller for the electric braking system, and electroresponsive means energized responsively to the operation of the said controller for controlling the service application of the air brakes from the electric braking system.

2. The combination with means for applying air brakes to a railway train unit and means for applying electric generative braking to the same unit, the two said braking means being each normally separately operable, of a controller for governing the electric braking, an electroresponsive valve in the air brake system, and connections whereby the said valve is energized through the said controller to restrain the simultaneous application of the electric braking and the service application of the air brakes.

3. The combination with an electric braking system for an electric locomotive or the like and an air brake system for the same having engineer's valve mechanism, of means whereby applying the electric brake renders the engineer's valve mechanism ineffective to make a service application of the air brakes and releasing the electric brake restores full control of the air brakes to the engineer's valve mechanism.

4. The combination with an electric braking system and an air braking system for an electric locomotive or the like, of means operable responsively to the brake pipe pressure of the air brake system for restraining the simultaneous application of the electric brake and the service application of the air brakes.

5. The combination with an electric braking system and an air braking system for an electric locomotive or the like, of means operative responsively to the brake pipe pressure of the air brake system and controlled by the electric braking system for restraining the simultaneous application of the electric brake and the service application of the air brakes.

6. Means for braking an electric locomotive or the like comprising an electric braking system, an air brake system having a distributing valve, and means operated responsively to the difference between the pressure of the brake pipe and the pressure of the brake cylinder side of the distributing valve for restraining the simultaneous application of the electric brake and the service application of the air brakes.

7. Means for braking an electric locomotive or the like, comprising an electric braking system, an air brake system having a distributing valve, and means controlled by the electric braking system and operative responsively to the difference between the pressure of the brake pipe and the pressure of the brake cylinder side of the distributing valve for controlling the service application of the air brakes from the electric braking system.

8. Means for braking an electric locomotive or the like comprising an electric braking system, an air brake system having a distributing valve, and an electromagnetically controlled valve in the air brake system between the brake cylinder and the distributing valve for restraining the simultaneous application of the electric brake and the service application of the air brakes.

9. The combination with an air brake system and an electric braking system for an electric locomotive or the like, the air brake system being governed by engineer's valve mechanism and the electric braking system governed by a controller, of means comprising electromagnetic valve mechanism in the air brake system and connections whereby moving the said controller to a braking position renders the engineer's valve mechanism ineffective to make an application of the air brakes and moving the controller to a predetermined position restores full control of the air brake system to the engineer's valve mechanism.

10. The combination with an air and an electric braking system for an electric locomotive or the like having engineer's valve mechanism for governing the operation of the air brakes and a controller for governing the operation of the electric braking system, of means controlled by the said controller and actuated responsively to the pressure in the train pipe of the air brake system for connecting the two braking systems, whereby moving the said controller to a braking position renders the engineer's valve mechanism ineffective to make a service application of the air brakes on the locomotive and moving the controller to a predetermined position restores full control of the air brake system to the engineer's valve mechanism.

11. The combination with means for braking an electric locomotive or the like, comprising an air brake system and an electric braking system in which the locomotive driving motors operate as generators, of a controller for the electric braking system, and means controlled by the said controller for releasing the air brakes when the controller is operated to apply the electric brake.

12. The combination with means for braking an electric locomotive or the like, comprising air brakes and a separately operable electric braking system, of a controller for governing the electric braking, engineer's valve mechanism independent of the said controller for governing the operation of the air brakes, and means actuated responsively to the train pipe pressure and controlled by the said controller for connecting the two braking systems, whereby after a service application of the air brakes on the locomotive is made by the operation of the engineer's valve mechanism, operating the controller to apply the electric brake releases the air brakes.

13. Means for braking an electric locomotive or the like, comprising an electric braking system, an air braking system having a distributing valve, and means controlled by the electric braking system for closing the passage in the air brake system from the distributing valve to the brake cylinder and opening that from the brake cylinder to the atmosphere upon the application of the electric brake.

14. Means for braking an electric locomotive or the like, comprising an electric braking system, an air braking system having a distributing valve, and means controlled by the electric braking system and operated responsively to the difference between the pressure of the brake pipe and the pressure of the brake cylinder side of the distributing valve of the air brake system for closing the passage from the distributing valve to the brake cylinder and opening that from the brake cylinder to the atmosphere upon the application of the electric brake.

15. The combination with means for braking an electric locomotive or the like comprising an electric braking system, and an air brake system having a distributing valve, a controller for governing the electric braking, engineer's valve mechanism independent of the said controller for governing the operation of the air brakes, and means comprising a release valve controlled by the said controller and actuated responsively to the difference between the pressure of the train pipe and the pressure of the brake cylinder side of the distributing valve for releasing the air brakes upon the application of the electric brake after a service application of the air brakes on the locomotive has been made by the operation of the engineer's valve mechanism.

16. The combination with means for braking an electric locomotive or the like, comprising an electric braking system and an air brake system having a distributing valve, of means connecting the two systems comprising a release valve controlled by the electric braking system and actuated responsively to the difference between the pressure of the train pipe and the pressure of the brake cylinder side of the distributing valve for releasing the air brakes when the electric brake is applied.

17. The combination with means for braking an electric locomotive or the like, comprising an electric braking system and an air brake system, of a release valve controlled by a valve actuated responsively to the application of the electric brake for connecting the brake cylinder to atmosphere upon the application of the electric brake.

18. The combination with an electric braking system for an electric locomotive and the cars drawn thereby and an air brake system having a distributing valve, of means comprising a release valve controlled by the electric braking system and operated responsively to the difference between the pressure of the brake pipe and the pressure of the brake cylinder side of the distributing valve in the air brake system for releasing the air brakes on the locomotive independently of the application of the air brakes on the cars upon an application of the electric brake on the locomotive.

19. The combination with an electric braking system for an electric locomotive or the like, of an air braking system for the same, and means for controlling the air braking system from the electric braking system to prevent a simultaneous application of the electric brake and a service application of the air brakes, upon the application of the electric brake, and to permit an emergency application of the air brakes independently of the electric brake.

20. The combination with an air and an electric braking system for an electric locomotive or the like, of a release valve in the air brake system and connections whereby the release valve is controlled by the electric braking system to prevent a simultaneous application of the electric brake and a service application of the air brakes, to release the service application of the air brakes upon the application of the electric brake, and to permit an emergency application of the air brakes independently of the electric brake.

21. The combination with means for braking an electric locomotive or the like, comprising an electric braking system and an air brake system having a valve for controlling the supply of air to the brake cylinder, of a release valve controlled by the electric braking system normally biased to connect the air brake cylinder to atmosphere and operated responsively to the pressure on the brake cylinder side of the first mentioned valve to apply the air brake, the said release valve operated responsively to the difference between the pressure in the train pipe and the pressure on the brake cylinder side of the first mentioned valve to connect the brake cylinder to atmosphere upon the application of the electric brake.

22. The combination with a regenerative brake, a brake cylinder, and a valve device for controlling the supply of fluid to the brake cylinder, of a valve mechanism for controlling communication from said valve device to the brake cylinder and means operated upon energization of the regenerative braking circuit for operating said valve mechanism to close communication from said valve device to the brake cylinder.

23. The combination with a regenerative brake and a fluid pressure brake, of a valve device adapted upon deenergization of the regenerative brake circuit to open communication through which the fluid is supplied to the brake cylinder and upon energization of said circuit to connect the brake cylinder with the exhaust.

In witness whereof, we have hereunto set our hands this 24th day of February, 1917.

RAY STEARNS.
GEORGE MACLOSKIE.